Patented Oct. 21, 1952

2,615,055

UNITED STATES PATENT OFFICE 2,615,055

CYCLIC OLEFINS

Carl B. Linn, Riverside, Ill., assignor to Universal Oil Products Company, Chicago, Ill., a corporation of Delaware No Drawing. Application May 9, 1950,
Serial No. 161,014

7 Claims. (Cl. 260—666)

This invention relates to a new and useful class of cyclic olefins and to a process for preparing them.

An object of this invention is to provide a novel class of cyclic olefins, particularly cyclic monoolefins with the olefinic double bond in a side chain which are adapted for use as intermediates in organic synthesis as in the production of esters of organic and inorganic acids, in the production of halides by addition of a hydrogen halide to the olefinic double bond, and in the oxidation of such cyclic olefins to form carbonyl compounds including aldehydes and ketones, some of which are cyclic.

One specific embodiment of this invention is a cyclic olefin having the structural formula

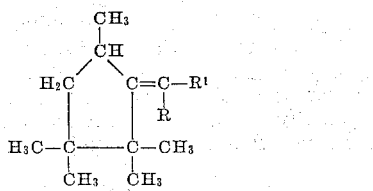

wherein R represents a member of the group consisting of hydrogen and an alkyl group and $R^1$ represents a member of the group consisting of an alkyl group, a cycloalkyl group, and an aryl group.

Another embodiment of this invention is a cyclic olefin having the structural formula

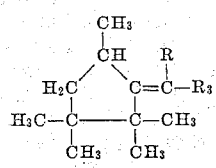

wherein R represents a member of the group consisting of hydrogen and an alkyl group.

A further embodiment of this invention is a cyclic olefin represented by the formula

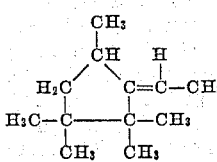

A still further embodiment of this invention is a cyclic olefin having the structural formula

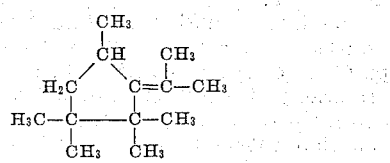

I have found that desoxymesityl oxide with the formula

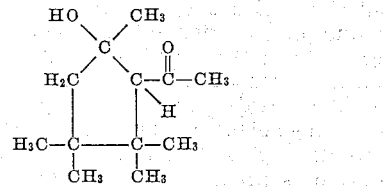

is a convenient starting material for the production of a cyclic olefin containing a cyclopentane ring in which two adjacent nuclear carbon atoms are combined with geminal methyl groups, that is, each of these adjacent nuclear carbon atoms is combined with two methyl groups. Such polymethylated cyclopentyl compounds also contain another methyl group combined with the other nuclear carbon atom that is adjacent to the nuclear carbon atom which is combined with the olefinic side chain. This olefinic side chain contains at least two carbon atoms and is connected by a double bond to the cyclopentane ring, that is, to the polyalkylated or polymethylated cyclopentane ring.

Thus a cyclic olefin of this invention is obtained by utilizing desoxymesityl oxide as a starting material for the series of reactions represented by the following equations:

(1) 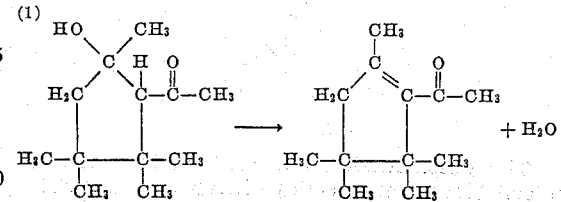 $+ H_2O$ (2) 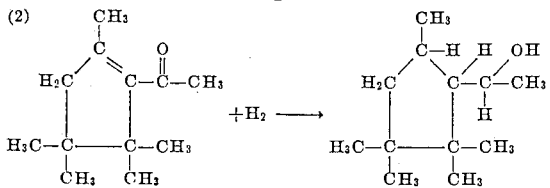

(3) 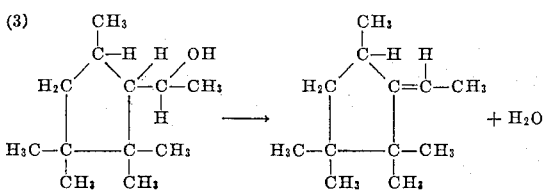

According to Equation 1 desoxymesityl oxide undergoes dehydration when heated to form a pentamethylcyclopentenylmethyl ketone which is then reduced catalytically with hydrogen as indicated in Equation 2 to form a cyclic carbinol which may be referred to as 1-(2',2',3',3',5'-pentamethylcyclopentyl) ethanol-1. This pentamethylcyclopentyl ethanol is then dehydrated as by passing over an alumina catalyst at a temperature of from about 400° to about 450° C. to form the pentamethylcyclopentyl olefin as indicated in Equation 3.

The hydrogenation treatment represented by Equation 2 is carried out, for example, at a temperature of from about 10° to about 75° C. and preferably at a temperature of from about 25° to about 50° C. in the presence of an active hydrogenation catalyst, such as reduced nickel supported on diatomaceous earth, Raney nickel, nickel-alumina, nickel-silica and also platinum catalyst such as platinum-alumina, platinum supported by charcoal, silica, and the like. Other suitable hydrogenation catalysts include a compound, and particularly an oxide of a metal selected from the members of the left hand columns of groups IV, V and VI of the periodic table. Of these oxide catalysts, chromia-alumina, and alumina-molybdic oxide are particularly effective although not at the same conditions of operation as utilized with other catalysts mentioned above, such as catalysts containing nickel and/or platinum.

Desoxymesityl oxide which is used as a starting material for producing the above-indicated pentamethylcyclopentyl olefin is produced by reacting mesityl oxide with an aluminum-mercury couple in wet ether solution whereby a condensation occurs which is represented by the following equation:

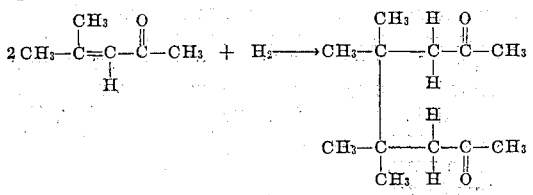

The resultant di-ketone apparently undergoes an internal aldol condensation to give desoxymesityl oxide which is represented by the formula

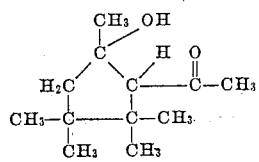

The desoxymesityl oxide which is a tertiary alcohol loses water readily when heated and yields an unsaturated ketone which is represented by the structure

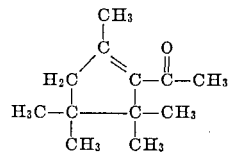

As aforementioned, catalytic hydrogenation of the unsaturated ketone converts it into a saturated alcohol of the formula

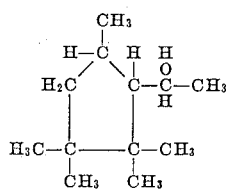

which may also be referred to as 1-(2',2',3',3',5'-pentamethylcyclopentyl) ethanol-1.

The pentamethylcyclopentyl ethanol represented by the above indicated formula is converted into the corresponding pentamethylcyclopentyl olefin by dehydration in the presence of a suitable catalyst. When this alcohol is passed over activated alumina at a temperature of from about 400° to about 450° C. and a charging rate corresponding to an hourly liquid space velocity of from about 0.2 to about 2, a substantial portion of the alcohol is dehydrated to the olefin having the structural formula given in Equation 3.

A homolog of this pentamethylcyclopentyl olefin which contains two methyl groups combined with the carbon atom joined by a double bond to the cyclopentyl ring is produced by reacting the dehydration product of desoxymesityl oxide with methyl magnesium bromide to form an unsaturated carbinol having two methyl groups combined with the carbon atom of the carbinol group, and also having a double bond in the 5-membered ring which is also combined with five methyl groups. The resultant pentamethylcyclopentenyldimethyl carbinol is hydrogenated catalytically at mild conditions to form 2-(pentamethylcyclopentyl) propanol-2 having the formula

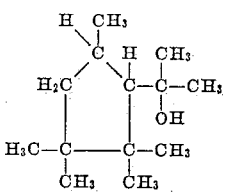

This alcohol upon dehydration as in the presence of alumina, silica-alumina composites, clays, etc. gives the corresponding mono-olefin in which the cyclopentyl ring is joined by a double bond to the carbon atom combined with two methyl groups in the aliphatic side chain.

Other polymethylated cyclopentyl olefins which contain a methyl group and either an alkyl, cycloalkyl, or aryl group, combined with the olefinic carbon atom which is joined by a double bond to the cyclopentane ring are produced by reacting the dehydration product of desoxymesityl oxide with $R^1MgBr$ in which $R^1$ represents an alkyl, cycloalkyl, or aryl group to form an unsaturated carbinol having geminal hydrocarbon groups combined with the carbon atom of the carbinol group and having a double bond in the 5-membered ring which is also combined with five methyl groups. The result pentamethylcyclopentenylmethyl-R¹-carbinol is hydrogenated catalytically at mild conditions to form a carbinol having the formula

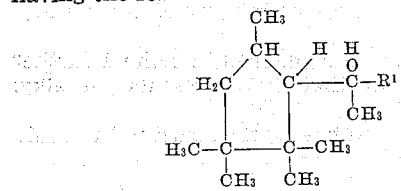

wherein R¹ represents a member of the group consisting of an alkyl group, a cycloalkyl group and an aryl group.

Catalytic dehydration of this carbinol in which the carbon atom of the carbinol group is combined with a methyl group and the R¹ group produces a cyclic-olefin in which the cyclopentyl ring is joined by a double bond to the side-chain carbon atom which is also combined with a methyl group and the R¹ group.

The nature of the present invention is illustrated further by the following example which should not be misconstrued to limit unduly the generally broad scope of the invention.

Mesityl oxide was reduced in wet ether solution by an aluminum-mercury couple to give a 60% yield of desoxymesityl oxide based upon the amount of mesityl oxide converted. In a typical preparation 200 grams of aluminum foil was converted into the aluminum-mercury couple following the procedure described by Vogel, J. Chem. Soc., 130, 594 (1927). This aluminum-mercury couple was then placed in a 5-liter flask provided with a large reflux condenser and containing about 2 liters of ether saturated with water. To this mixture in the 5-liter flask, 200 grams of mesityl oxide was then added. With an active aluminum-mercury couple, reaction began in a few minutes and reached a maximum in an hour or so and then gradually subsided after which about 100 grams of water was added while the vigorous boiling action continued in the reaction flask. After standing overnight, the ether was filtered from the solid which remained in the flask, was dried over calcium chloride and then distilled at atmospheric pressure to separate ether from the product, comprising essentially desoxymesityl oxide. A general summary of the production of desoxymesityl oxide is given in Table I.

TABLE I

*Reduction of mesityl oxide with aluminum-mercury couple*

| Run | 8 | 12 | 14 | 16 | 18 |
|---|---|---|---|---|---|
| Charge: | | | | | |
| Aluminum used in preparing couple, grams | 200 | 210+200 | 220 | 306+150 | 300+300 |
| Ether, liters | 2.7 | 3 | 3 | 4 | 4 |
| Mesityl oxide, grams | 202 | 210 | 225 | 306 | 300 |
| Water added, grams | 180 | 200+150 | 200 | 250 | 250 |
| Recovery: | | | | | |
| Ether-free Product, grams | 190 | 175 | 195 | 300 | 295 |
| B. P. near mesityl oxide, grams | 43.5 | 118 | 123 | 86 | 49 |
| B. P. greater than mesityl oxide, grams | 146.5 | 52 | 72 | 214 | 246 |
| Loss, grams | 12 | 35 | 30 | 6 | 5 |

Fractional distillation of the desoxymesityl oxide was accompanied by loss of weight at a temperature of about 150° which resulted in the formation of an olefinic ketone (B) which was a mixture of isomers with the olefinic double bond located at different positions in the 5-membered ring of the pentamethylcyclopentenylmethyl ketone.

A portion of this olefinic ketone (B) was then subjected to catalytic hydrogenation in the presence of a pentane diluent or solvent and a nickel-diatomaceous earth catalyst containing about 60% by weight of freshly reduced nickel. The results obtained in these hydrogenation runs at temperatures of 25° and 75° C. are indicated in Table II.

TABLE II

| Runs | 1 | 2 |
|---|---|---|
| Vol. of autoclave, ml | 128 | 450 |
| Grams (B) charged | 10 | 37 |
| n-Pentane, ml | 22.0 | 33 |
| Grams Ni catalyst | 1 | 5 |
| Initial Hydrogen Pressure, Atm | 100 | 100 |
| Temperature, °C | 25 | 75 |
| Hours, Hydrogen absorbed | 14 | 4 |
| Mols per mol (B) | 2.0 | 2.2 |

DISTILLATION OF PRODUCT FROM RUN 1

| Cut | B. P._{750} °C. | Weight Percent | $n_D^{20}$ |
|---|---|---|---|
| 1 | 215–216 | 15 | 1.4543 |
| 2 | 217 | 30 | 1.4543 |
| 3 | 218 | 17 | 1.4544 |
| 4 | 219 | 18 | 1.4548 |
| Bottoms | | 20 | 1.4567 |

DISTILLATION OF PRODUCT FROM RUN 2

| Cut | B. P._{.14} °C. | Calc. B. P._{760} °C. | Weight Percent | $n_D^{20}$ | $D_4^{20}$ |
|---|---|---|---|---|---|
| 1 | 82–96 | 211 | 11 | 1.4478 | |
| 2 | 96–101 | 211–217 | 24 | 1.4529 | |
| 3 | 101–104 | 217–220 | 23 | 1.4535 | 0.860 |
| 4 | 104–109 | 220–226 | 16 | 1.4580 | |

ELEMENTARY ANALYSIS

| | Found for— | | Calc. for $C_{12}H_{24}O$ |
|---|---|---|---|
| | Run 1, Cut 2 | Run 2, Cut 3 | |
| Percent C | 78.50 | 78.68 | 78.19 |
| Percent H | 12.74 | 13.13 | 13.13 |

Infrared analysis of the resultant hydrogenated product boiling between 215° and 220° C. at 760 mm. pressure showed it to contain an hydroxyl group and in general to be in agreement with values expected for a carbinol with the structure

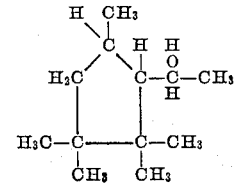

Accordingly, at low temperatures catalytic hydrogenation of the unsaturated dehydrogenation product of desoxymesityl oxide saturated the double bond and also reduced the carbinol group to an hydroxyl group, giving a carbinol with the structure shown above.

26 grams of a blend of cuts 1 to 4 of the product from run 2 referred to in Table II was passed over activated alumina catalyst in a vertical reactor at an hourly liquid space velocity of 0.7. A catalyst temperature of 350° C. was found to be too low for active dehydration and accordingly the catalyst temperature was increased and maintained at 415° C. while the carbinol was passed through at an hourly liquid space velocity of 0.7. The resultant product consisted of 2.2 ml. of water and 23.3 ml. of oil. Fractional distillation of the oil separated it into the following cuts with the properties shown in Table III.

TABLE III

| Cut | B. P._{742} ° C. | Weight Percent | $n_D^{20}$ | $D_4^{20}$ |
|---|---|---|---|---|
| 1 | 134–157 | 6.1 | 1.4341 |  |
| 2 | 157–175 | 7.8 | 1.4436 |  |
| 3 | 175–180 | 9.9 | 1.4453 |  |
| 4 | 180–181 | 6.7 | 1.4456 |  |
| 5 | 181–182 | 7.2 | 1.4458 |  |
| 6 | 182–183 | 11.6 | 1.4462 | .789 |
| 7 | 183–183 | 11.7 | 1.4474 |  |
| 8 | 183–185 | 10.3 | 1.4495 |  |
| 9 | 185–190 | 8.0 | 1.4541 |  |
| 10 | 190–195 | 4.9 | 1.4599 |  |
| 11 | 195–200 | 4.2 | 1.4643 |  |
| 12 |  | 5.0 | 1.4640 |  |
| Bottoms |  | 6.4 | 1.4803 |  |

ELEMENTARY ANALYSIS

|  | Found for Cuts 4–7 | Calc. for $C_{12}H_{22}$ |
|---|---|---|
| Percent C | 86.04 | 86.66 |
| Percent H | 13.95 | 13.34 |

Infrared analysis of cuts 4–7 of the dehydration product referred to in Table III showed the presence of one double bond per molecule.

This example thus illustrated a process which is effective for producing a pentamethylcycloalkyl alkene which comprises dehydrating desoxymesityl oxide to form pentamethylcyclopentenylmethyl ketone, hydrogenating said ketone to form pentamethylcyclopentylmethyl carbinol, and dehydrating said carbinol to form a pentamethylcyclopentyl alkene. By these steps desoxymesityl oxide is converted into a pentamethylcyclopentyl substituted olefin in which the double bond of the olefin is between the cyclopentane ring and a carbon atom of a side chain combined with said cyclopentane ring.

I claim as my invention:

1. A cyclic olefin having the structural formula

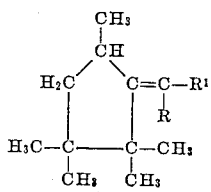

wherein R represents a member of the group consisting of hydrogen and an alkyl group and R¹ represents a member of the group consisting of an alkyl group, a cycloalkyl group, and an aryl group.

2. A cyclic olefin as defined in claim 1 further characterized in that R¹ represents an alkyl group.

3. A cyclic olefin having the structural formula

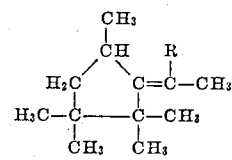

wherein R represents a member of the group consisting of hydrogen and an alkyl group.

4. A cyclic olefin having the structural formula

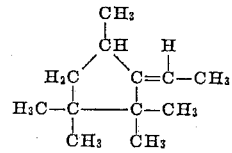

5. A cyclic olefin having the structural formula

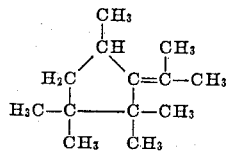

6. A cyclic olefin containing a cyclopentane ring in which each of two adjacent nuclear carbon atoms is combined with geminal methyl groups and in which a single methyl group is combined with a third nuclear carbon atom, there being an olefinic hydrocarbon radical of at least two carbon atoms connected by a double bond to a fourth nuclear carbon atom adjacent said third carbon atom in said ring, the fifth carbon atom of said ring having two hydrogen atoms attached thereto.

7. A compound as defined in claim 6 further characterized in that said olefinic hydrocarbon radical consists of an aliphatic group.

CARL B. LINN.

REFERENCES CITED

The following references are of record in the file of this patent:

Godchot, "Comptes Rendus," vol. 156 (1913), pp. 470–73.

Godchot, "Comptes Rendus," vol. 172 (1921), pp. 686–88.

Braun et al., "Berichte Deut. Chem. Cess.," vol. 67 (1934), pp. 225–30.